(12) United States Patent
Lundy et al.

(10) Patent No.: US 8,010,107 B1
(45) Date of Patent: Aug. 30, 2011

(54) METHOD AND SYSTEM FOR USER-REQUESTED VERTICAL HANDOFF

(75) Inventors: Michael T. Lundy, Olathe, KS (US); Benjamin P. Blinn, Leawood, KS (US); Kevin E. Hunter, Olathe, KS (US); Louie E. Wingo, Liberty, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1460 days.

(21) Appl. No.: 11/217,652

(22) Filed: Sep. 1, 2005

(51) Int. Cl.
*H04W 36/00* (2009.01)

(52) U.S. Cl. ........ 455/436; 455/437; 455/438; 455/439; 455/442; 455/443; 455/444; 455/552.1; 455/553.1; 370/328; 370/331; 370/332; 370/334

(58) Field of Classification Search .................. 455/436, 455/437, 438, 439, 442, 443, 444, 552.1, 455/553.1; 370/328, 331, 332, 334
See application file for complete search history.

(56) References Cited

U.S. PATENT DOCUMENTS

| | | | |
|---|---|---|---|
| 6,327,470 B1 | 12/2001 | Ostling | |
| 6,487,410 B1 | 11/2002 | Kontio et al. | |
| 6,763,234 B1 * | 7/2004 | Kabasawa | 455/436 |
| 2001/0024953 A1 * | 9/2001 | Balogh | 455/432 |
| 2004/0142693 A1 | 7/2004 | Feder et al. | |
| 2005/0036504 A1 * | 2/2005 | Joshi et al. | 370/441 |
| 2005/0043026 A1 * | 2/2005 | Brok et al. | 455/434 |

OTHER PUBLICATIONS

Glen Dobson, "Supporting Streamed Multimedia in a Mobile Environment," BSc. Thesis, Lancaster University, Apr. 2002.
Chen, "A Smart Decision Model for Vertical Handoff," Proc. 4th ANWIRE International Workshop on Wireless Internet and Re-configurability, 2004.

* cited by examiner

*Primary Examiner* — Stephen M D'Agosta

(57) ABSTRACT

While a mobile node is engaged in a communication session via a first air interface channel, the user of the mobile node requests a vertical handoff. In response to the user's handoff request, the mobile node goes into a dormant mode to release the first air interface channel. The mobile node then acquires a second air interface channel, which may have a higher data rate than the first air interface channel, and continues the communication session via the second air interface channel. The mobile node may also determine that a vertical handoff may be available, e.g., by checking a preferred roaming list (PRL), and then indicate to the user that a vertical handoff may be available.

4 Claims, 4 Drawing Sheets

METHOD AND SYSTEM FOR USER-REQUESTED VERTICAL HANDOFF

BACKGROUND

1. Field of the Invention

The present invention relates to telecommunications and, more particularly, to a method and system for effecting a vertical handoff that is requested by a user of a mobile node.

2. Description of Related Art

There is an increased interest in providing wireless telecommunications systems that support high data rates. One such approach is a "data-only" approach, often referred to as "EV-DO," in which communications over the air interface are in the form of data packets, whether the underlying media being transferred is voice, data, or some other type. The EV-DO approach makes use of an "IS-856" air interface protocol that is described in a number of specifications. For example, Revision A of the IS-856 protocol is described in $3^{rd}$ Generation Partnership Project 2, "cdma2000 High Rate Packet Data Air Interface Specification," 3GPP2 C.S0024-A, v1.0 (March 2004), which is incorporated herein by reference. This air interface protocol can provide peak data rates as high as 3.1 Mbps on the forward link and 1.8 Mbps on the reverse link. In contrast, "legacy" air interface protocols, such as IS-2000, typically provide much lower data rates.

Although high data rate protocols, such as IS-856, provide many advantages over legacy protocols, such as IS-2000, the processing of upgrading to IS-856 may occur over an extended period of time and/or may occur in only certain areas. Thus, a mobile node roaming through a wireless service provider's network may encounter some areas in which both IS-856 and IS-2000 coverage is available but may also encounter certain areas in which only IS-2000 coverage is available.

To address the use of different air interface protocols in different areas, many mobile nodes are able to communicate using multiple air interface protocols. Thus, a mobile node may be able to communicate using either IS-2000 or IS-856. To help manage the different availabilities of air interface protocols in different areas, a mobile node may be provisioned with a preferred roaming list (PRL) that identifies what systems and/or air interface protocols are preferred in different areas. For example, a PRL may specify that IS-856 is preferred over IS-2000 because of its higher potential data rate.

Nonetheless, certain situations can result in having a mobile node use a non-preferred protocol for communications, even though a preferred protocol is available. One such situation can occur as a result of handoffs that are made as a mobile node moves through different areas that have different protocol availabilities. For example, when a mobile node that is engaged in a communication session moves from an area in which only IS-2000 is available to an area in which both IS-856 and IS-2000 is available, the mobile node may continue using IS-2000 for the communication session, even though IS-856 is available and preferred.

Accordingly, there is a need to provide ways in which a mobile node can make better use of a preferred air interface protocol in areas where the preferred protocol is available.

SUMMARY

In a first principal aspect, an exemplary embodiment of the present invention provides a method for vertical handoff in a wireless network. In accordance with the method, while a mobile node is engaged in a communication session via a first air interface channel, the mobile node receives a handoff request from a user. In response to the handoff request, the mobile node goes into a dormant mode to release the first air interface channel. The mobile node acquires a second air interface channel, and the mobile node continues the communication session via the second air interface channel.

In a second principal aspect, an exemplary embodiment of the present invention provides a method for vertical handoff in a wireless network. In accordance with the method, while a mobile node is engaged in a communication session using a first air interface protocol, the mobile node determines whether a second air interface protocol may be available. If the mobile determines that the second air interface protocol may be available, the mobile node provides a user-discernible indication that a vertical handoff may be available. The mobile node receives a vertical handoff request from a user. In response to the vertical handoff request, the mobile node continues the communication session using the second air interface protocol.

In a second principal aspect, an exemplary embodiment of the present invention provides a mobile node adapted for vertical handoff. The mobile node comprises a first module for communication via a first air interface protocol, a second module for communication via a second air interface protocol, a user interface for providing an indication that a vertical handoff may be available and for receiving a handoff request, system information, and selection logic. The selection logic operates such that, when the mobile node is engaged in a communication session using the first air interface protocol, the selection logic consults the system information to determine whether the second air interface protocol is available and, if so, causes the user interface to provide the indication.

DETAILED DESCRIPTION OF EXEMPLARY EMBODIMENTS

1. Overview

The present invention, in exemplary embodiments, facilitates a user of a mobile node to request a vertical handoff from a first air interface channel (e.g., an IS-2000 channel) to a second air interface channel (e.g., an IS-856 channel). In this way, the user may be able to specifically request a handoff to an air interface channel that has a higher potential data rate. Although IS-2000 and IS-856 channels are described herein as exemplary, it is to be understood that the vertical handoff could occur between other types of air interface channels.

To request a vertical handoff, the user may interact with a user interface of the mobile node, e.g., by pressing a button or by tapping a touch screen. The user may request a vertical handoff when, e.g., based on prior experience, the user believes that the mobile node is operating in an area where a vertical handoff is available. The mobile node may also prompt the user, for example, by displaying an indication on a display of the mobile node that a vertical handoff may be available. The mobile node may determine that a vertical handoff is available by referring to a preferred roaming list (PRL). Alternatively, the wireless network may determine that a vertical handoff is available and send a signal to the mobile node.

When the user requests a vertical handoff while the mobile node is engaged in a communication session via a first air interface channel, the mobile node may go into a dormant state to release the first air interface channel. The mobile node may then acquire a second air interface channel and continue the communication session via the second air interface channel.

2. Exemplary Network Architecture

Figure 1:
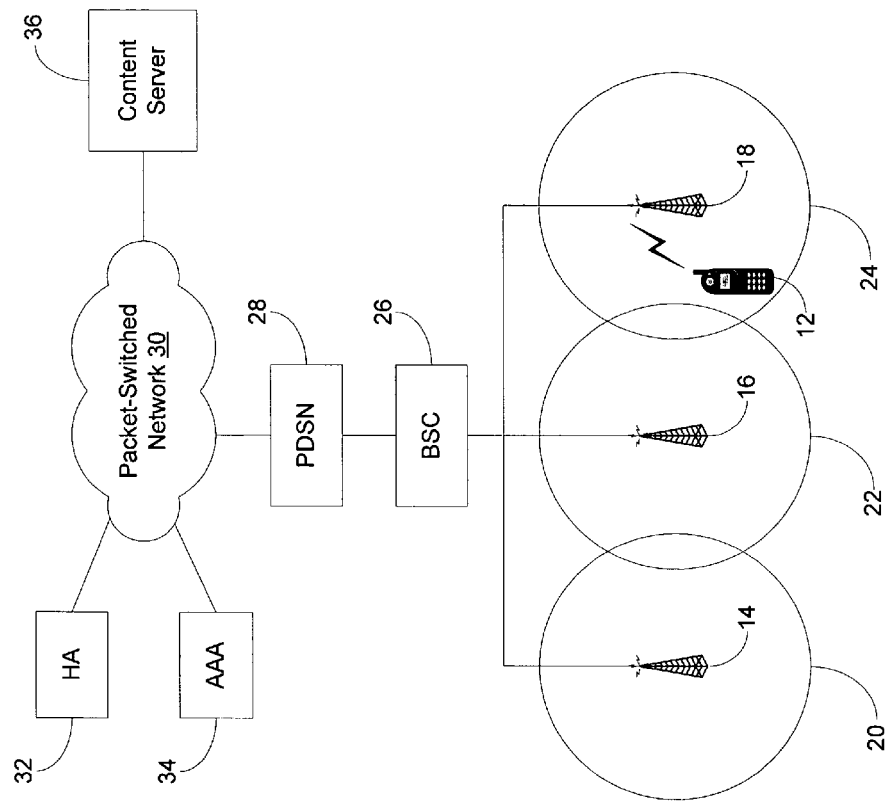
FIG. 1 is a simplified block diagram of a wireless telecommunications network, in accordance with an exemplary embodiment of the present invention.

FIG. 1 illustrates an exemplary wireless telecommunications system 10. In an exemplary embodiment, system 10 provides mobile nodes, such as mobile node 12, with wireless packet-based communication service, through which mobile nodes may send and receive voice, data, video and/or other media via an air interface. Mobile node 12 could be, for example, a wireless telephone, wireless personal digital assistant (PDA) or other wireless communication device.

The communications over the air interface may conform to or make use of various communication protocols, such as IS-2000 and IS-856. Mobile nodes, such as mobile node 12, may be able to use multiple communication protocols. Thus, mobile node 12 might preferentially use IS-856 for communication when available, e.g., because of the higher data rate that IS-856 can potentially provide. However, if IS-856 is unavailable, mobile node 12 may instead use IS-2000 for communication.

In this regard, different communication protocols may be available in different areas. For example, as shown in FIG. 1, system 10 may include base transceiver stations (BTSs) 14, 16, and 18 that provide wireless coverage in areas 20, 22, and 24, respectively. Among these BTSs, BTSs 14 and 18 might have both IS-2000 and IS-856 channels available, whereas BTS 16 might have only IS-2000 channels available. Thus, when operating in area 20 or 24, mobile node 12 may preferentially use IS-856 for communication. However, when mobile node 12 operates in area 22, mobile node 12 may instead use IS-2000 for communication because IS-856 coverage is not available. It is to be understood that this particular arrangement of availability of different protocols in different areas is exemplary only. Other arrangements, which may involve different numbers of BTSs, different protocols, and/or different protocol availability patterns, are possible.

BTSs 14, 16, and 18 may be controlled by a base station controller (BSC) 26. Although, in this example, BTSs 14, 16, and 18 are controlled by the same BSC, it is to be understood that BTSs 14, 16, 18 may be controlled by different BSCs. BSC 26 may, in turn, be communicatively coupled to a packet data serving node (PDSN) 28 that provides access to a packet-switched network 30.

Packet-switched network 30 may include a wide area network, such as the Internet, that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 30 in a real-time format.

Other protocols, such as the Session Initiation Protocol (SIP), may be used to set up and/or manage communication sessions through packet-switched network 30.

PDSN 28 may communicate with various network elements in order to set up communication sessions through packet-switched network 30 on behalf of mobile nodes, such as mobile node 12. For example, PDSN 28 may communicate with a home agent 32, which may support Mobile IP functions for mobile nodes, such as mobile node 12, including the dynamic assignment of IP addresses for use by mobile nodes. PDSN 28 may also communicate with an authentication, authorization, and accounting (AAA) server 34 that performs authentication, authorization, and accounting functions for mobile nodes, such as mobile node 12. For example, PDSN 28 may communicate with AAA server 34 in accordance with RADIUS protocols.

Once a communication session involving mobile node 12 is established, PDSN 28 then sends and receives packets on behalf on mobile node 12. Such communication sessions may involve the transfer of voice, data, video, and/or other media. In an exemplary communication session, mobile node 12 communicates with a content server 36 via packet-switched network 30. Content server 36 may provide various types of content to mobile node 12 in various types of communication sessions. For example, content server 36 may provide streaming video or other media to mobile node 12 during a communication session. It is to be understood that such communication sessions with content server 36 are exemplary only. Mobile node 12 could communicate with other types of endpoints (e.g., other types of servers, other mobile nodes, or other types of telephony devices) via packet-switched network 30 in other types of communication sessions.

3. Exemplary Mobile Node

Figure 2:
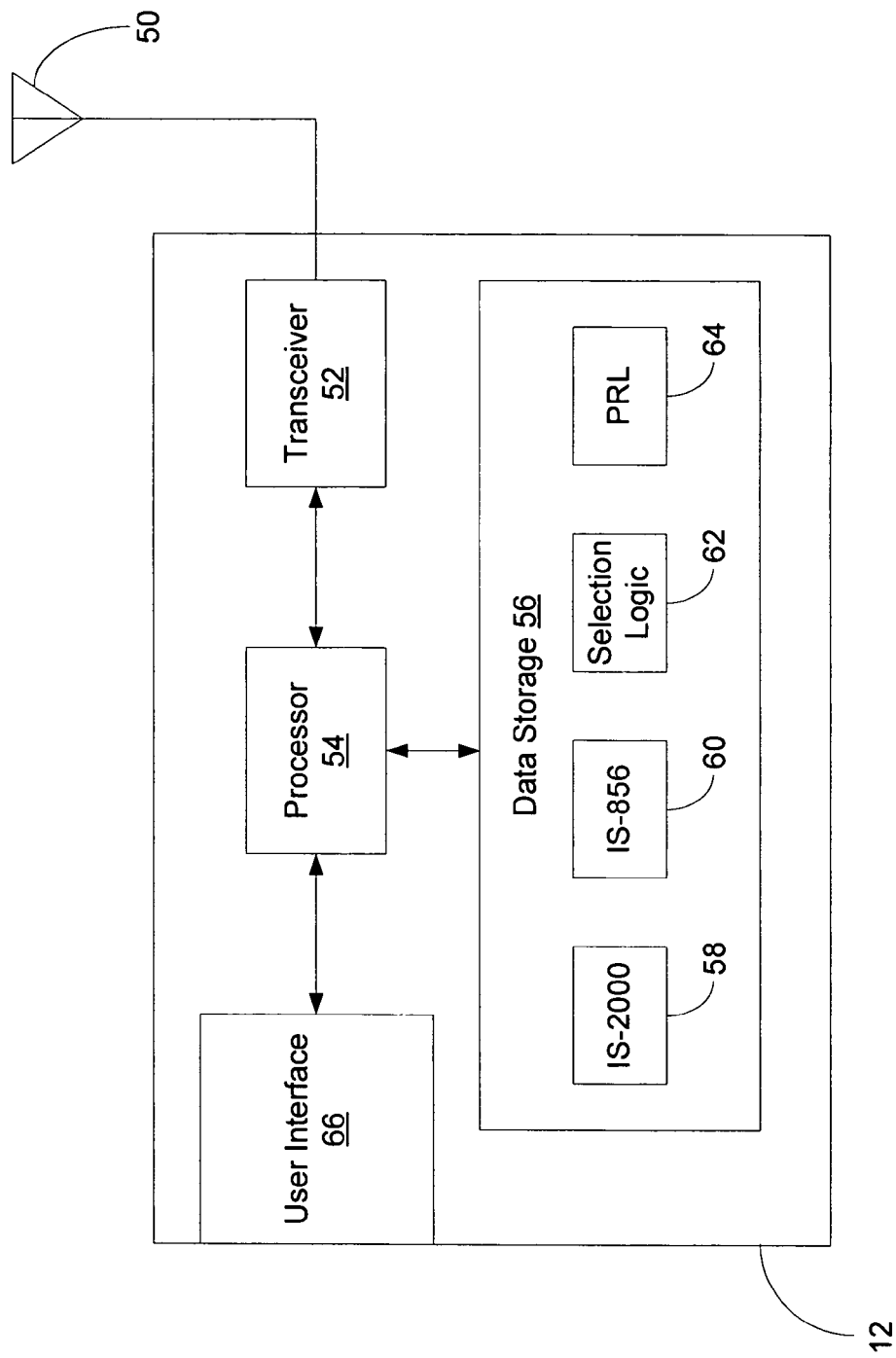
FIG. 2 is a simplified block diagram of an exemplary mobile node, in accordance with an exemplary embodiment of the present invention.

FIG. 2 is a block diagram of an exemplary mobile node 12. Mobile node 12 may include an antenna 50 coupled to a transceiver 52. The operation of mobile node 12 may be controlled by a processor 54 that is coupled to transceiver 52 and to a data storage 56. Data storage 56 may include volatile and/or non-volatile memory and may store machine language instructions that are executable by processor 54 to control the operation of mobile node 12. The machine language instructions may include various modules for communicating via various communication protocols. In an exemplary embodiment, mobile node 12 is able to use IS-2000 and IS-856 for communication. Thus, data storage 56 may include an IS-2000 module 58 for IS-2000 communication and an IS-856 module 60 for IS-856 communication. Although FIG. 2 shows modules 58 and 60 stored in data storage 56, modules 58 and 60 could be provided as software, firmware, and/or hardware. Moreover, it is to be understood that the IS-2000 and IS-856 communication protocols are exemplary only. Mobile node 12 could communicate using other protocols in addition to or instead of IS-2000 and IS-856.

Data storage 56 may also store other types of programming and/or data. For example, data storage 56 may store selection logic 62 that controls the selection between communication protocols. Data storage 56 may also store system information regarding the wireless systems that mobile node 12 may access. Such system information may be organized as a "preferred roaming list" (PRL) 64. PRL 64 may list available wireless systems in a priority order, e.g., with each wireless system identified by a "system identification code" (SID) and a "network identification code" (NID). In addition, PRL 64 may specify whether a given system uses IS-2000, IS-856, or some other protocol for communication.

PRL 64 may also specify whether a given system using one protocol, e.g., IS-2000, is associated with a system that uses a different protocol, e.g., IS-856. Such an association may indicate that the IS-856 system is available as an "overlay" on the IS-2000 system, i.e., that the IS-856 system provides coverage in the same general area as the IS-2000 system. Thus, when mobile node 12 discovers the presence of an IS-2000 system that PRL 64 indicates is associated with an IS-856 system, mobile node 12 may then search for and register with the associated IS-856 system. Further details regarding an exemplary PRL that identifies associated system are set forth in U.S. Application No. 11/103,259, filed Apr. 11, 2005, which application is fully incorporated herein by reference.

Processor 54 may also be coupled to a user interface 66. User interface 66 may include components, such as a speaker and microphone, for audio communication with the user. Through such audio components, user interface 66 may convey voice or other audio to the user and may receive voice or other audio from the user. User interface 66 may also include one or more components, such as a display, for visual communication of textual, graphical, or other information to the user. User interface 66 may also include one or more input devices for receiving input from the user. Such input devices may include, for example, a touch screen, a keypad, buttons, and/or other controls.

User interface 66 may interact with selection logic 62 to facilitate the user to request a vertical handoff from one communication protocol to another (e.g., from IS-2000 to IS-856). For example, if the user interacts with user interface 66 to request a vertical handoff, selection logic 62 may check PRL 64 to determine whether an associated system is available. If PRL 64 indicates that no associated system is available (e.g., mobile node 12 is operating in an IS-2000 area that does not have an IS-856 overlay), then selection 62 may cause user interface 66 to indicate to the user that a vertical handoff is not available. On the other hand, if PRL 64 indicates that an associated system is available, then selection logic 62 may cause mobile node 12 to go into a dormant state and then acquire an air interface channel from the associated system.

Selection logic 62 may also function to determine when a vertical handoff may be available and to so indicate to the user. For example, if mobile node 12 is being served by an IS-2000 system, selection logic 62 may consult PRL 64 to determine whether the IS-2000 is associated with an IS-856 system. If PRL 64 identifies an associated IS-856 system, selection logic 62 may cause user interface 66 to indicate to the user that a vertical handoff may be available. The indication could be, for example, a textual or graphical indication on a display. The indication could also provide a way for the user to request s vertical handoff. For example, user interface 66 may display an icon where a user could tap a touch screen to request a vertical handoff.

4. Exemplary Operation

Figure 3:
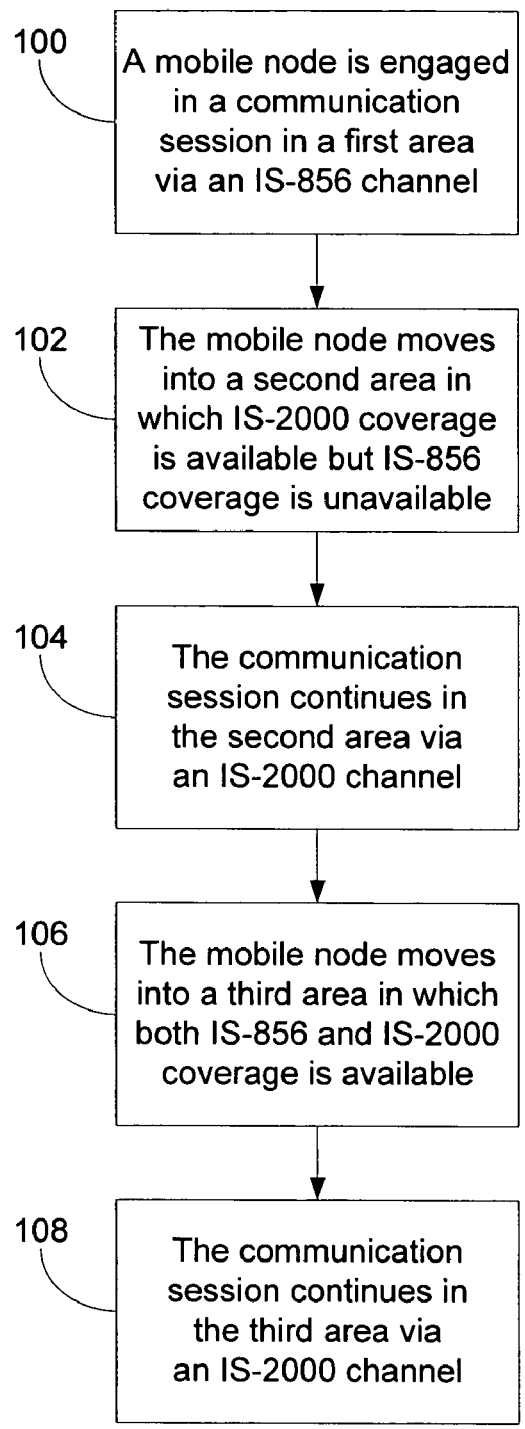
FIG. 3 is a flow chart showing steps of an exemplary method for vertical handoff, in accordance with an exemplary embodiment of the present invention.
Figure 4:
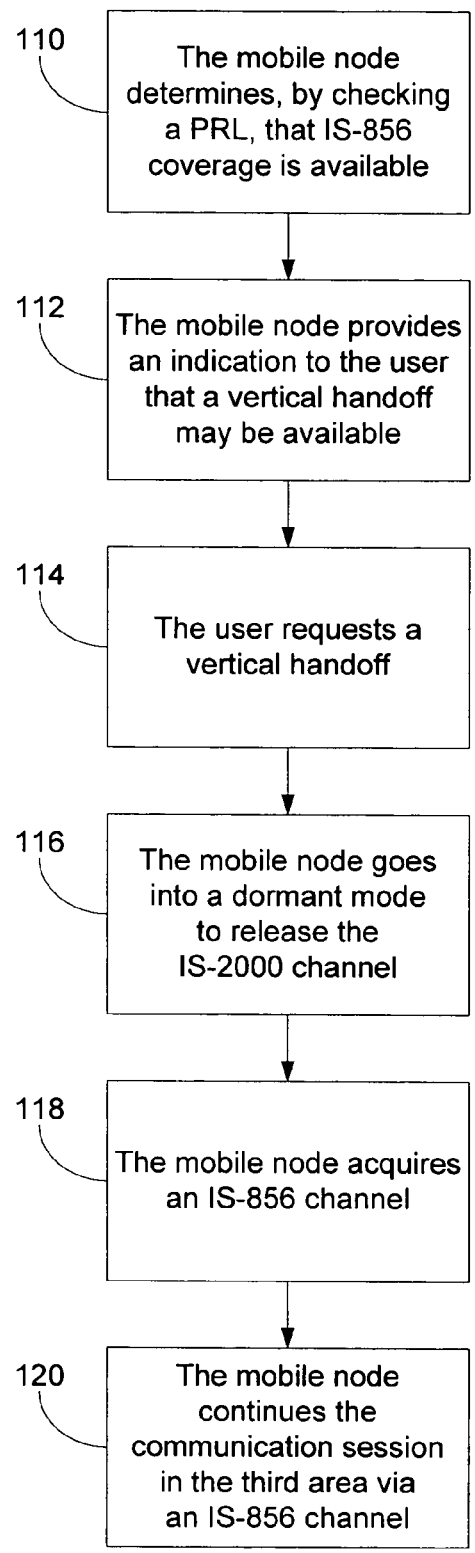
FIG. 4 is a flow chart showing additional steps of an exemplary method for vertical handoff, in accordance with an exemplary embodiment of the present invention.

FIGS. 3 and 4 illustrate an exemplary operation for effecting a vertical handoff from an IS-2000 system to an IS-856 system. The steps illustrated in FIGS. 3 and 4 may be performed in wireless telecommunications systems 10, as illustrated in FIG. 1, using mobile node 12, as illustrated in FIG. 2. However, it is to be understood that other network architectures and other mobile node configurations could be used.

FIG. 3 illustrates steps leading up to a scenario in which a vertical handoff may be desirable, e.g., to achieve a higher potential data rate. The process may begin when a mobile node is engaged in a communication session in a first area via an IS-856 channel, as indicated by block 100. For example, mobile node 12 may be engaged in a streaming video session with content server 36 while operating in an area, such as area 20, that has both IS-856 and IS-2000 channels available. Though both types of channels are available, the mobile node may be configured to prefer IS-856 channels because of the higher data rates that IS-856 can potentially provide.

At some point during the communication session, the mobile node may move into a second area in which IS-2000 coverage is available but IS-856 coverage is unavailable, as indicated by block 102. For example, mobile node 12 may move from area 20 to area 22. Because the mobile node has moved into a different area, a horizontal handoff may be effected. However, because IS-856 is unavailable in the second area, the mobile node may be handed down to an IS-2000 channel. Thus, the communication session may continue in the second area via an IS-2000 channel, as indicated by block 104.

While the communication session is ongoing, the mobile node may move into a third area, in which both IS-856 and IS-2000 coverage are available, as indicated by block 106. For example, mobile node 12 may move from area 22 to area 24. Because the mobile node has moved into a different area, a horizontal handoff may be effected. However, because IS-2000 was used in the second area, the handoff may be to another IS-2000 channel in the third area, even though IS-856 is available. Thus, the communication session may continue in the third area via an IS-2000 channel, as indicated by block 108.

However, the user may have an opportunity to request a vertical handoff to an IS-856 channel, as illustrated in FIG. 4. The process may begin when the mobile node determines, e.g., by checking a PRL, that IS-856 coverage is available, as indicated by block 110. For example, the PRL may indicate that the IS-2000 system in the third area is associated with an IS-856 system. In response, the mobile node may provide an indication to the user that a vertical handoff may be available, as indicated by block 112. The indication could be, for example, in the form of a textual and/or graphical indication on a display of the mobile node. Alternatively, the indication could be provided in some other form, e.g., as a sound or vibration.

In an alternative approach, the wireless network, rather than the mobile node, determines that IS-856 coverage is available. The wireless network may then send a signal to the mobile node to indicate that IS-856 is available. In response to the signal from the wireless network, the mobile node may provide a textual, graphical, or other indication to the user that a vertical handoff may be available. Further details regarding how the wireless network may make this determination are provided in U.S. application Ser. No. 11/044,764, filed Jan. 27, 2005, which is fully incorporated herein by reference.

After being prompted, as in block 112, the user may request a vertical handoff, as indicated by block 114. To make the request, the user may interact with a user interface of the mobile node, e.g., by pressing a button or tapping on a touch screen. In response to the user's request, the mobile node may go into a dormant mode to release the IS-2000 channel, as indicated by block 116. The mobile node then acquires an IS-856 channel, as indicated by block 118. Once the IS-856 channel is acquired, the mobile node continues the communication session in the third area via an IS-856 channel, as indicated by block 120. For example, the application running on the mobile node may be put on hold when the mobile node goes into a dormant mode and may resume the communication session once the IS-856 channel is acquired. To continue the communication session via the IS-856 channel, the participants of the communication session (e.g., the mobile node and content server) may re-send any packets that were not received during the period when the mobile node was in dormant mode.

In this way, the user may take advantage of the potentially higher data rate offered by IS-856 by specifically requesting a vertical handoff. In exemplary embodiments, the user may request a vertical handoff (i) without being prompted to do so, (ii) after the mobile node determines that IS-856 coverage may be available and indicates to the user that a vertical handoff may be available, or (iii) after the wireless network signals to the mobile node that IS-856 coverage may be available and the mobile node indicates to the user that a vertical handoff may be available.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A mobile node adapted for vertical handoff, comprising:
   a first module for communication via a first air interface protocol;
   a second module for communication via a second air interface protocol;
   a user interface for providing an indication that a vertical handoff may be available and for receiving a handoff request;
   system information that lists a plurality of available systems and identifies associations between said available systems; and
   selection logic, wherein when said mobile node is engaged in a communication session with a first system using said first air interface protocol, said selection logic consults said system information to determine whether said first system is associated with a second system that uses said second air interface protocol and, if so, causes said user interface to provide said indication.

2. The mobile node of claim 1, wherein said system information includes a preferred roaming list (PRL).

3. The mobile node of claim 2, wherein said PRL lists a plurality said available systems in a priority order and indicates what air interface protocol is used by each of said available systems.

4. The mobile node of claim 1, wherein said selection logic responds to said handoff request by causing said mobile node to go into a dormant state and acquire an air interface channel from said second system for continuation of said communication session.

* * * * *